J. H. DAVIS.
GANG PLOW CONSTRUCTION.
APPLICATION FILED MAY 15, 1919.
1,358,939.
Patented Nov. 16, 1920
2 SHEETS—SHEET 1.
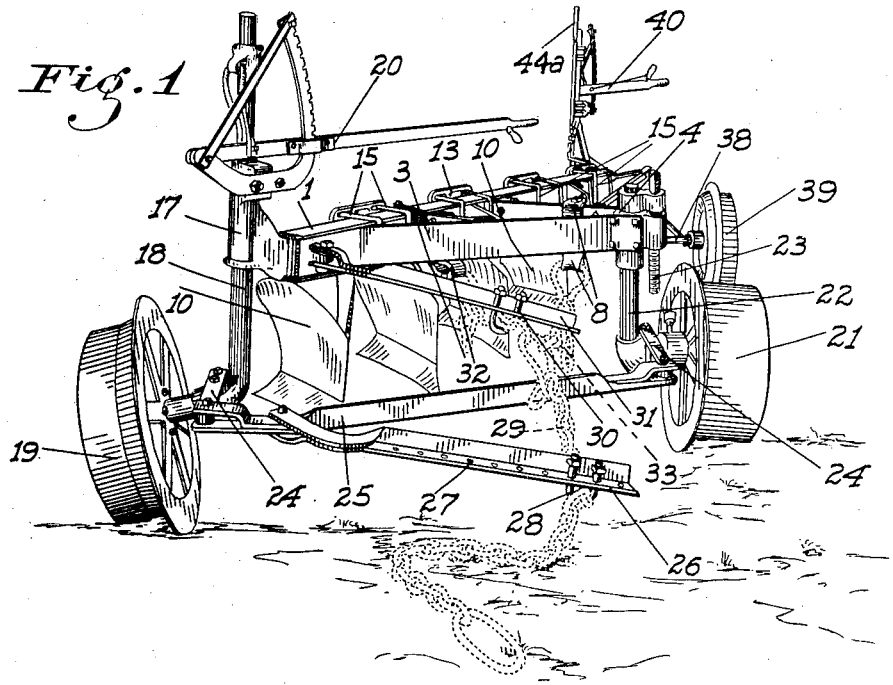
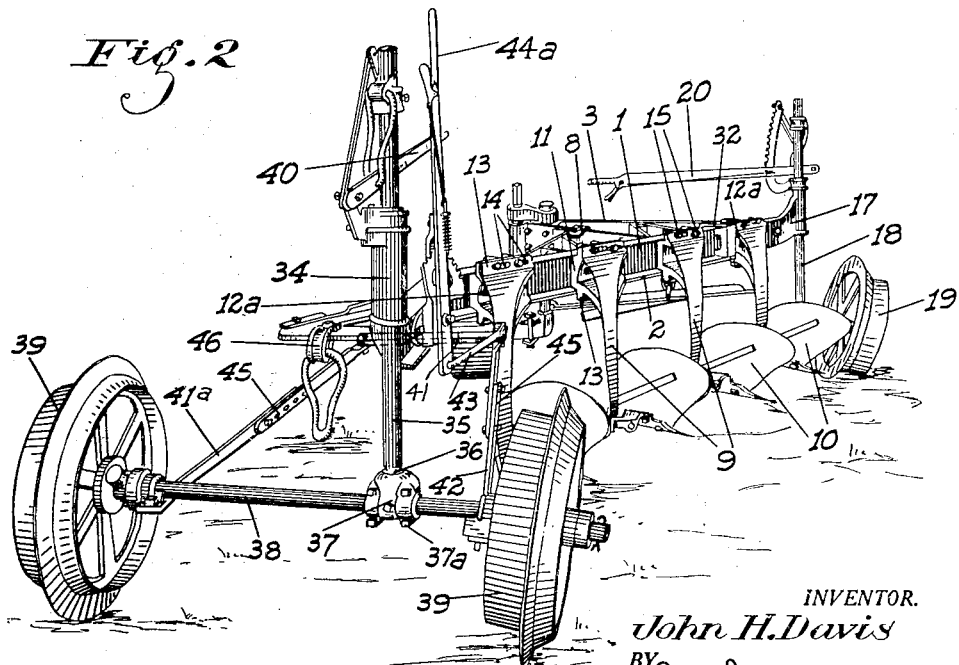
INVENTOR.
John H. Davis
BY
ATTORNEY

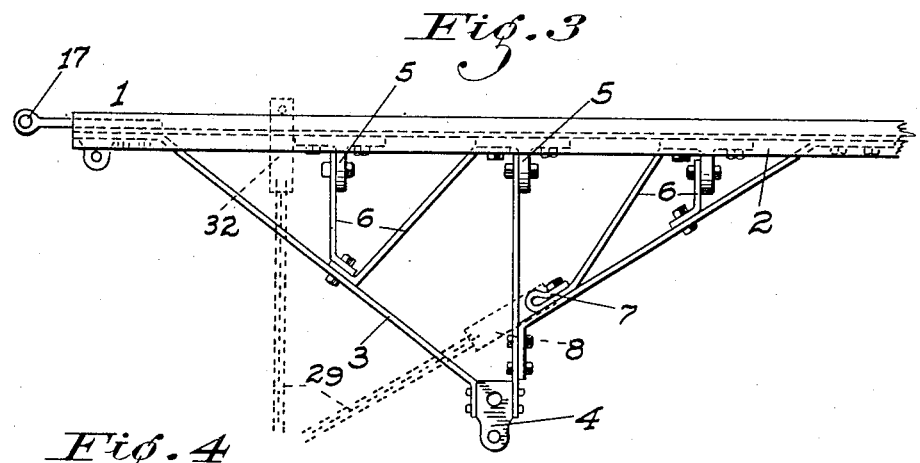
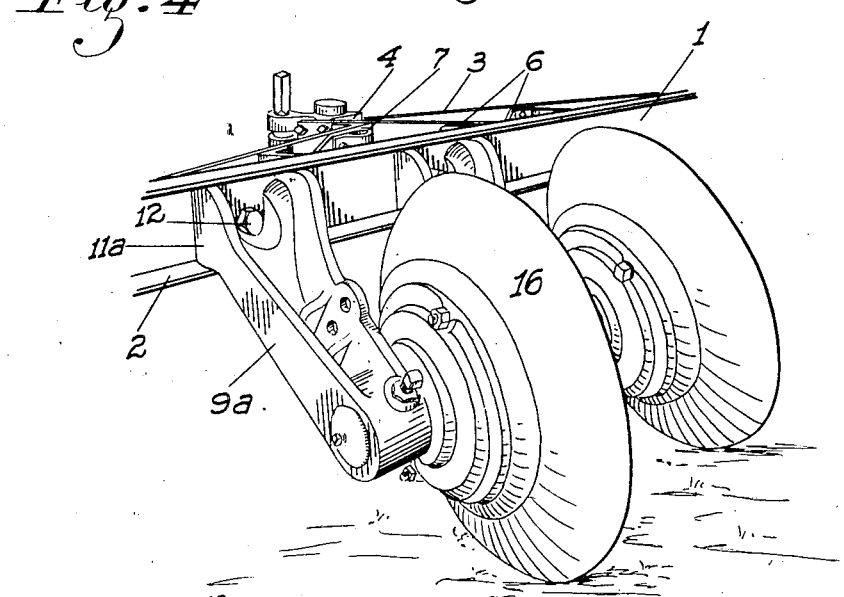
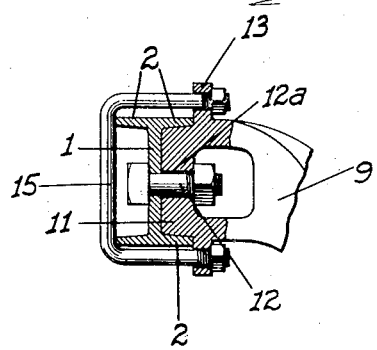

UNITED STATES PATENT OFFICE.

JOHN H. DAVIS, OF STOCKTON, CALIFORNIA.

GANG-PLOW CONSTRUCTION.

1,358,939.   Specification of Letters Patent.   Patented Nov. 16, 1920.

Application filed May 15, 1919. Serial No. 297,190.

*To all whom it may concern:*

Be it known that I, JOHN H. DAVIS, a citizen of the United States of America, residing at Stockton, in the county of San Joaquin, State of California, have invented certain new and useful Improvements in Gang-Plow Construction; and I do declare the following to be a clear, full, and exact description of the same, reference being had to the accompanying drawings, and to the characters of reference marked thereon, which form a part of this application.

This invention relates to improvements in gang plows and particularly to a type especially adapted to be drawn by a tractor, the principal object of the invention being to so construct the frame and running gear of the plow that either the disk or moldboard type of plowing device may be used without making any structural alterations to the frame or changing the draft, and the change from one type to the other made in a short time at any place where an ordinary wrench is handy.

I have also constructed my plow with a relatively high frame so that large disks, etc., can be used therewith, which can plow to a depth of sixteen inches if desired and still keep the frame well above ground.

I have also provided the main frame of the plow with an auxiliary frame securely braced to the main frame, so that the draft chains may be branched and connected both to the auxiliary and the main frames, thus distributing the pulling strain throughout the structure and averting the danger of warping or buckling the main frame when plowing in hard ground, or under similar conditions of heavy work.

It is a well known fact that most small tractors, pulling a load really somewhat too great for them, have a tendency to side slip, and hence on the after run, travel with one wheel or track in the furrow previously cut. This is obviously objectionable, and I have overcome this by having a perfect wheel control on the front and rear of the plow frame.

The rear supporting or furrow wheels are manually steered, but for the forward wheels I have produced an arrangement which is adjustable and actuated by the draft-chains, whereby the front wheels, when the tractor is pulling, may be angled in such a manner as to counteract and overcome the tendency of the tractor to slip sidewise, aided by the aforementioned rear steering wheels.

These results and objects I accomplish by means of such structure and relative arrangement of the parts as will fully appear by a perusal of the following specifications and claims.

On the drawings, similar characters of reference indicate corresponding parts in the several views.

Figure 1 is a perspective front end elevation of my improved plow, showing the moldboard type of plow thereon.

Fig. 2 is a similar rear end elevation.

Fig. 3 is a top plan view of the main frame, showing the auxiliary frame and the bracing thereof.

Fig. 4 is a fragmentary side view of the main frame, showing disk-plow standards attached thereto.

Fig. 5 is a fragmentary cross-section through a plow standard.

Referring now more particularly to the characters of reference on the drawings, the numeral 1 denotes the main frame of the plow, which is positioned at a suitable angle to the line of travel of the plow, and is preferably in the form of an I-beam, set vertically, thus having horizontal flanges 2 on both sides of the top and bottom edges.

Projecting from one side of the frame in the same plane thereof is a substantially V-shaped auxiliary frame 3 of bar-iron rigidly bolted to the frame 1 between the flanges thereof, there being a block-casting 4 at the apex of such auxiliary frame for a purpose later described.

Rigidly bolted to the frame 1, between the flanges thereof and at spaced intervals, are T-shaped castings 5 to which are secured braces 6 extending to the frame 3. One of such braces to the rear of the block 4 terminates in a loop 7 for the reception of a draw-chain clevis 8 therein.

On the outer side of the frame 1 are a plurality of spaced plow standards 9, having moldboards 10 on the lower ends thereof, the upper ends of such standard having relatively long bosses 11 thereon, of a height adapting them to fit between the flanges 2 of the frame 1. These bosses have bolts 12 passing through longitudinal slots 12ª and through the frame 1, which bolts, where convenient, may be the same ones which hold the members 5 to the frame.

Longitudinal flanges 13 extend from the bosses 11 beyond both flanges 2, and are slotted as at 14 to receive the ends of U-bolts 15 therethrough, which pass around the frame 1, and thus rigidly but adjustably clamp the standards 9 to the frame.

Similarly the standards 9ª of disk plows 16 have bosses 11ª on their upper ends adapted to be interchangeable with the standards 9, and secured to the frame 1 in a similar manner.

At the forward end of the frame 1 is a vertically orificed casting 17 projecting therebeyond, in which is turnably mounted the pedestal or support 18 of a furrow wheel 19. This pedestal is adapted for vertical adjustment by means of a suitable lever mechanism 20. A similar wheel 21 is mounted to a pedestal 22 turnable in the block 4 on the auxiliary frame, such pedestal being also vertically adjustable by any suitable means, such as a screw 23.

Arms 24 are rigidly secured to the members 18 and 22, and project forward thereof, being connected by a bar 25.

A bar 26 is pivotally mounted to the bar 25 near the end thereof adjacent the wheel 19, and is provided with a plurality of orifices 27 therein, any two of which are adapted to receive a U-bolt 28 therethrough adapted to clamp a link of the draft chain 29 in any desired position.

This chain then passes through a U-bolt 30 similarly mounted to a bar 31 pivoted at one end to the frame 1, near the forward end thereof, and thence to a clevis 32 mounted to the frame 1, just behind the foremost of the plow standards 9.

Just forward of the U-bolt 30 the chain branches as at 33 and extends to the clevis 8 on the auxiliary frame 3.

By this means it is possible to adjust the draft chain so that an equal load is thrown on both branches of the same, and the pulling strain distributed evenly through both frames of the plow. Also, by proper adjustment of the U-bolts 28 and 30 in their respective bars, which alters the point of transverse pull of the chain relative to the fixed clevises, the bar 25 will be forced to one side to a certain extent, thus angling the wheels 19 and 21 relative to the line of travel of the plow, and making it possible for the tractor to be run slightly to one side of the plow while still maintaining the straight forward travel of the plow and eliminating the side-slip tendency of the tractor as previously mentioned.

At the rear end of the frame 1, is a vertically orificed casting 34 secured thereto, in which is turnably mounted a pedestal 35 whose lower end forms a ball and socket joint 36 with a clamp block 37 through which extends a shaft 38, having furrow wheels 39 on the ends thereof, one of such wheels being adapted to travel in the furrow of the rearmost one of the plows 10. By means of the bolts 37ª on the block 37, the shaft may be positioned at any desired transverse position relative to the pedestal 35, so that if the rear one of the plows 10 is removed, the wheel 39 may be shifted over to place it in alinement with the furrow made by the remaining rearmost plow. Vertical adjustment of the pedestal 35 is had by any suitable lever means such as shown at 40.

The shaft 38 is normally held in any desired position by means of a bar 41 pivoted under and to the frame 1. To the ends of this bar are pivoted bars 41ª and 42 which extend to the opposite ends of the shaft 38. A short arm 43 is also pivotally connected to the bar 42, and extends to the lower end of a lever 44 mounted to the frame 1.

Both bars 41ª and 42 are arranged for adjustments in their lengths, as shown at 45, so that the transverse setting of the shaft 38 may be altered independently of the steering lever.

By means of the ball and socket mounting of the shaft 38, together with the flexibly connected bars 41ª and 42, the wheels 39 are free to tilt in a transverse plane, and yet be easily steered at all times by the lever 43, and raised or lowered by the lever means 40.

It will also be noted that I have thus produced a four wheel supported plow; but one having a three point suspension; such points being wheels 19 and 21, and the ball and socket connection 36 of the arm 35 (which is rigid with the frame) with the shaft 38.

Hence, by reason of this construction, the frame will be amply supported, by the widely spaced wheels and yet will be enabled to travel over uneven ground without danger of twisting the frame, as is the case with plows having four rigidly mounted wheels, owing to the pivotal or ball connection of the wheel shaft 38 with the frame.

A clevis 46 is secured to the frame 1 at the rear end thereof, so that another gang plow may be attached to the one shown and both drawn along together.

Thus, from the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent, is:

1. A gang plow including a main frame beam positioned at an angle to the line of travel and adapted to have a plurality of plows secured thereto, and an auxiliary V-shaped frame on the forward side of the main frame having its apex substantially central of the length of the main beam and rigidly braced thereto at a plurality of points, there being a draw bar clevis adjacent the apex of the auxiliary frame and a similar connection at the forward end of the main beam whereby the main frame will be prevented from any tendency to buckle which might be caused by the drag on the plows.

2. A gang plow including a main frame beam positioned at an angle to the line of travel and adapted to have a plurality of plows secured thereto, an auxiliary V-shaped frame on the forward side of the main frame having its apex substantially central of the length of the main beam, a plurality of braces extending between the frames at right angles to the main frames, a plurality of diagonal braces between the right angled braces connecting the two frames and being on a line with the line of travel of the plow, a drawbar clevis at the forward end of the main frame and a similar connection at the junction of one of the diagonal braces with the auxiliary frame to the rear of the apex thereof, whereby the pull on the drawbar is distributed throughout the main and auxiliary frames.

3. A gang plow including a relatively high main frame, the frame having longitudinal flanges thereon at the top and bottom thereof, a plurality of plow standards having their upper ends relatively long and adapted to fit between the flange bolts through the frame and standards, flanges running lengthwise on the standards and extending above and below the flanges on the frame, and U-bolts encompassing the frame and secured to the flanges in the standards through holes provided therein, whereby the standards are rigidly but removably secured to the frame and the same strengthened thereby.

4. A gang plow including a main frame positioned at an angle to the line of travel, longitudinal flanges on the frame at the top and bottom thereof, an auxiliary V-shaped frame projecting from the main frame on one side thereof, a plurality of relatively long rigid members bolted between the flanges of the main frame on the side thereof adjacent the auxiliary frame, lugs formed integral with the rigid members projecting at right angles thereof, and braces bolted to the lugs and extending to and secured to the auxiliary frame, both frames being adapted for connection to a branched draw-chain at predetermined points whereby some of the strain of pulling is taken by the auxiliary frame and the danger of buckling the main frame is averted.

In testimony whereof I affix my signature in presence of two witnesses.

JOHN H. DAVIS.

Witnesses:
 BERNARD PRIVAT,
 F. H. CARTER.